US008043022B2

(12) United States Patent
Chau

(10) Patent No.: US 8,043,022 B2
(45) Date of Patent: Oct. 25, 2011

(54) SHEET SECURING SCAFFOLD CLAMP

(75) Inventor: Alexander S. Chau, Alberta (CA)

(73) Assignee: Brand Services, LLC, Chesterfield, MO (US)

( * ) Notice: Subject to any disclaimer, the term of this patent is extended or adjusted under 35 U.S.C. 154(b) by 638 days.

(21) Appl. No.: 11/476,274

(22) Filed: Jun. 28, 2006

(65) Prior Publication Data

US 2006/0291956 A1 Dec. 28, 2006

(30) Foreign Application Priority Data

Jun. 28, 2005 (CA) ..................................... 2510944

(51) Int. Cl.
*F16D 1/00* (2006.01)
(52) U.S. Cl. ...................... 403/338; 403/373; 403/374.3
(58) Field of Classification Search .................. 403/274, 403/286, 289, 338, 373, 374.3, 344, 374.1; 248/222.13, 228.1, 229.11, 229.12, 229.21, 248/230.2; 24/19, 270, 268, 503, 515, 536; 249/46
See application file for complete search history.

(56) References Cited

U.S. PATENT DOCUMENTS

| 392,431 | A | * | 11/1888 | Higgins | 248/229.24 |
|---|---|---|---|---|---|
| 1,549,811 | A | * | 8/1925 | Schissel | 249/48 |
| 1,552,912 | A | * | 9/1925 | Colt | 249/219.1 |
| 1,682,740 | A | * | 9/1928 | Colt | 249/46 |
| 2,222,339 | A | * | 11/1940 | Schenk | 249/46 |
| 2,975,904 | A | * | 3/1961 | Krebs et al. | |
| 3,121,470 | A | | 2/1964 | Stone et al. | |
| 3,679,250 | A | * | 7/1972 | Marsden | 403/313 |
| 3,707,304 | A | * | 12/1972 | Gostling | 403/314 |
| 3,851,983 | A | * | 12/1974 | MacKenzie | 403/312 |
| 3,977,647 | A | * | 8/1976 | Williams | 249/45 |
| 3,996,650 | A | * | 12/1976 | Tonn | |
| 4,097,169 | A | * | 6/1978 | Kelly | 403/396 |
| 4,492,005 | A | * | 1/1985 | Begley et al. | 24/270 |
| 4,566,819 | A | * | 1/1986 | Johnston | 403/385 |
| 4,574,534 | A | | 3/1986 | Beaton | |
| 4,632,221 | A | * | 12/1986 | Stanford | 403/385 |
| 4,805,735 | A | | 2/1989 | Anderson | |
| 4,875,549 | A | | 10/1989 | Denny et al. | |
| 5,038,889 | A | | 8/1991 | Jankowski | |
| 6,142,428 | A | * | 11/2000 | Kamata et al. | 248/74.1 |

FOREIGN PATENT DOCUMENTS

| CA | 2510944 | | 12/2006 |
|---|---|---|---|
| FR | 1099331 | * | 9/1955 |
| FR | 1118050 | * | 5/1956 |
| JP | 07166694 A | * | 6/1995 |
| NL | 528214 | * | 5/1954 |

* cited by examiner

*Primary Examiner* — Victor MacArthur
(74) *Attorney, Agent, or Firm* — Peter S. Gilster; Greensfelder, Hemker & Gale, P.C.

(57) ABSTRACT

An elongated clamp for securing a flexible fabric like shroud to a scaffold support member including to opposed jaws movable between an open and closed position by a pin and wedge combination. The flexible shroud is held to the support member by the clamp gripping force. Multiple clamps securable at different points along the various standard support members provide positive securement of the shroud.

3 Claims, 6 Drawing Sheets

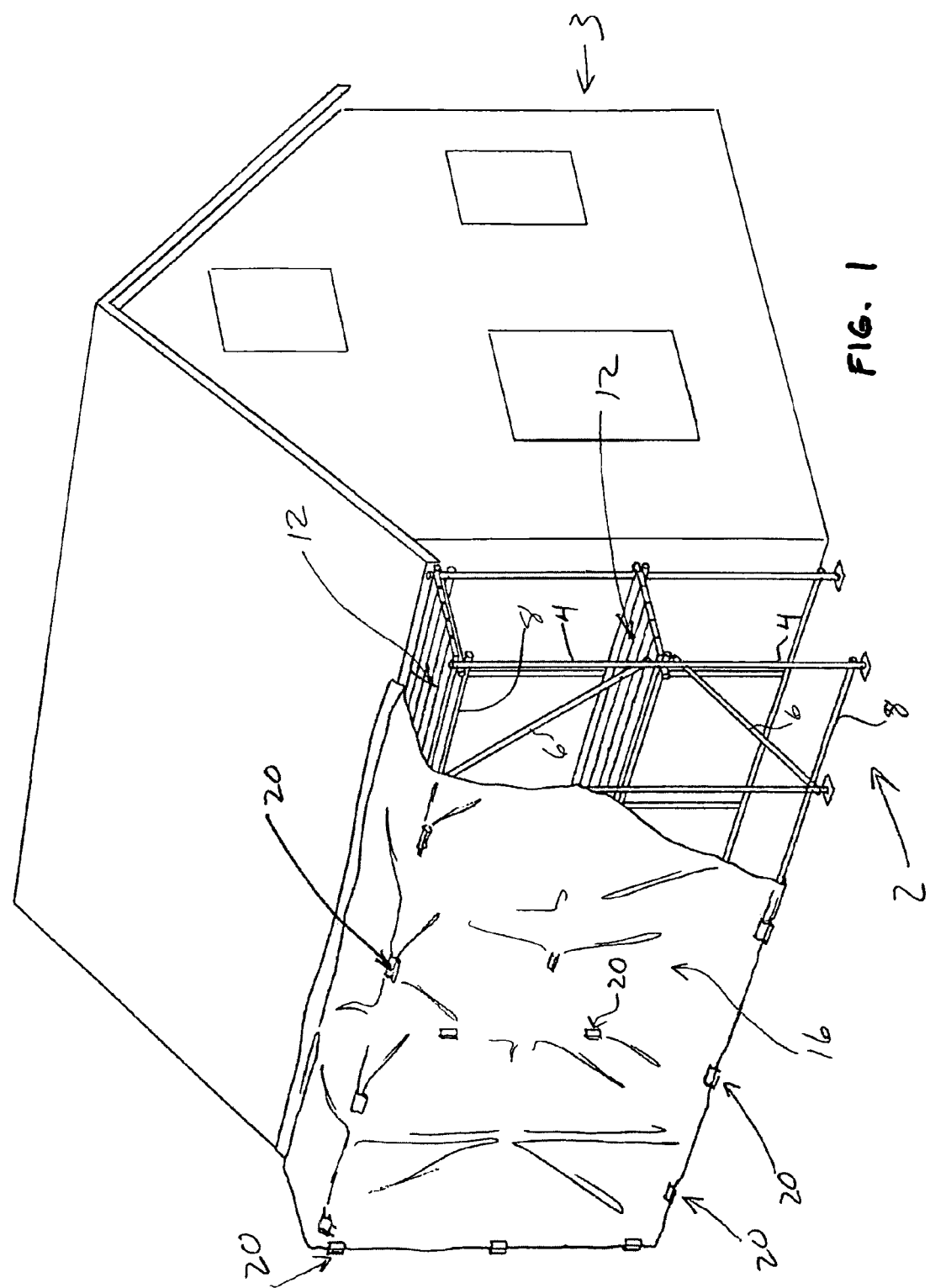

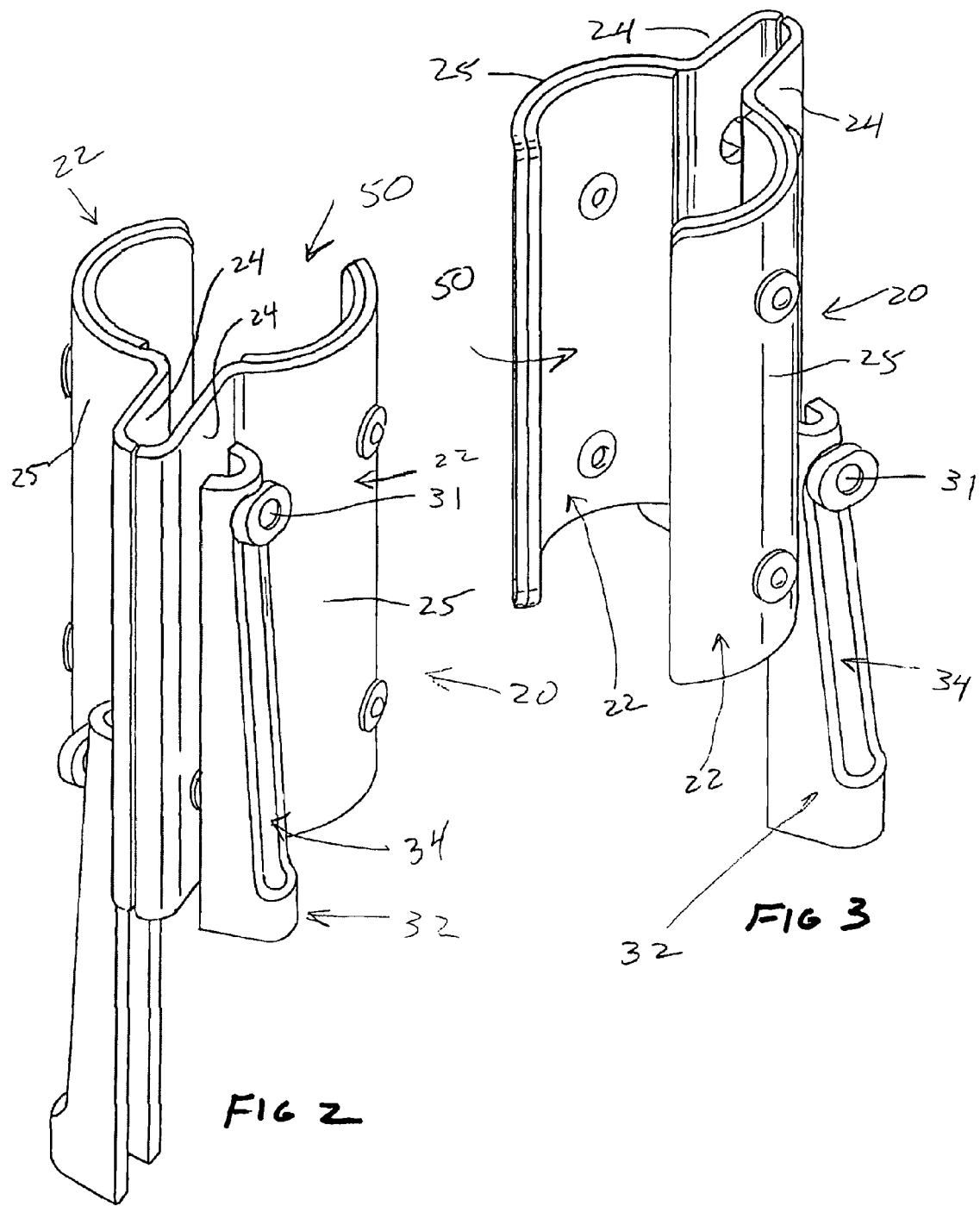

SHEET SECURING SCAFFOLD CLAMP

FIELD OF THE INVENTION

The present application relates to an elongate clamp for use with scaffolding and the securement of a sheet material to a scaffold support.

BACKGROUND OF THE INVENTION

Scaffolding is commonly used to provide a work platform at a raised height and allows safe repair or maintenance of a structure. For some applications scaffolding is used in association with preventative maintenance associated with a particular building or structure and the length of time the scaffolding remains in place is relatively long. Depending upon the particular project and environment it is sometimes necessary to provide shrouding to the exterior of the scaffolding to provide a wind or weather block. Thus, shrouding is particularly used to protect a worker from unnecessary exposure to wind, rain and/or snow.

Various methods have been proposed for attaching of a sheet material to the exterior of the scaffolding. According to one system a specialized fabric shrouding with a series of ports therein are designed to be connected on posts provided on the scaffolding. This system requires both a specialized shrouding as well as customized scaffolding. Typically, there are a number of different types of scaffolding and only a relatively small portion of the scaffolding on hand may require shrouding. Furthermore, scaffolding is used in many different configurations and any system for securing shrouding requires flexibility with respect to securement locations and ease of securement. Therefore, although specialized securing methods and approaches have been proposed they have not proven to be particularly effective.

There remains a need to provide a simple effective approach for securing a fabric shroud to scaffolding.

SUMMARY OF THE PRESENT INVENTION

An elongate clamp for use in securing a sheet material to a tubular upright comprises first and second opposed jaw members having a group therebetween on one side to allow a tubular upright to be received in a securement cavity defined by said opposed jaw members. Each jaw member including an engagement flange in overlapping relationship with the engagement flange of the other jaw member to maintain said jaw members in opposed relation. The jaw members being adjustably pin secured in an open or closed condition by at least one pin and wedge combination. The at least one pin and wedge combination is retained on the opposed flanges. The wedge of at least one pin and wedge combination is moveable from a released position where the jaws can be separated to increase the opening on the one side for receiving a scaffold support to a closed position where the at least one wedge and pin draws the jaws towards one another to effect gripping about a tubular support inserted between the jaws.

According to as aspect of the invention, the at least one pin and wedge combination is two pin and wedge combination.

According to an aspect of the invention the elongate clamp includes a resilient compressive layer lining each jaw and defining an interior surface of each jaw.

In yet a further aspect of the invention the opening defines a maximum gap between the jaws less than 50 percent of the length of the engagement flanges.

In yet a further aspect of the invention each wedge includes a center slot running between opposed ends of the wedge and the pin associated with the wedge passes through the center slot and captures the wedge on the pin.

According to a further aspect of the invention the preferred two pin and wedge combinations are located on opposite sides and at opposite ends of the engagement flanges. Preferably, the wedges are located on opposite sides.

In a further aspect of the invention the clamp is reversible in orientation.

In yet a further aspect of the invention each pin and wedge is pivotally supported on the engagement flanges and is rotatable to allow alignment of the wedges along the engagement flanges or across the engagement flanges and in either configuration are used to effect movement of the jaws towards one another. This particular arrangement allows the wedges to be orientated across the flanges and is advantageous when the clamp is positioned in close proximity to a horizontal surface where movement of the wedges to a closed position is awkward.

BRIEF DESCRIPTION OF THE DRAWINGS

The above as well as other advantages and features of the present invention will be described in greater detail according to the preferred embodiments of the present invention in which;

FIG. 1 is a perspective view of a scaffolding system show adjacent a building with the scaffolding system having fabric shrouding secured thereto and held by a series of clamps;

FIG. 2 is a rear perspective view of the clamp in an open position;

FIG. 3 is a front perspective view of the clamp in an open position;

Figure 4:
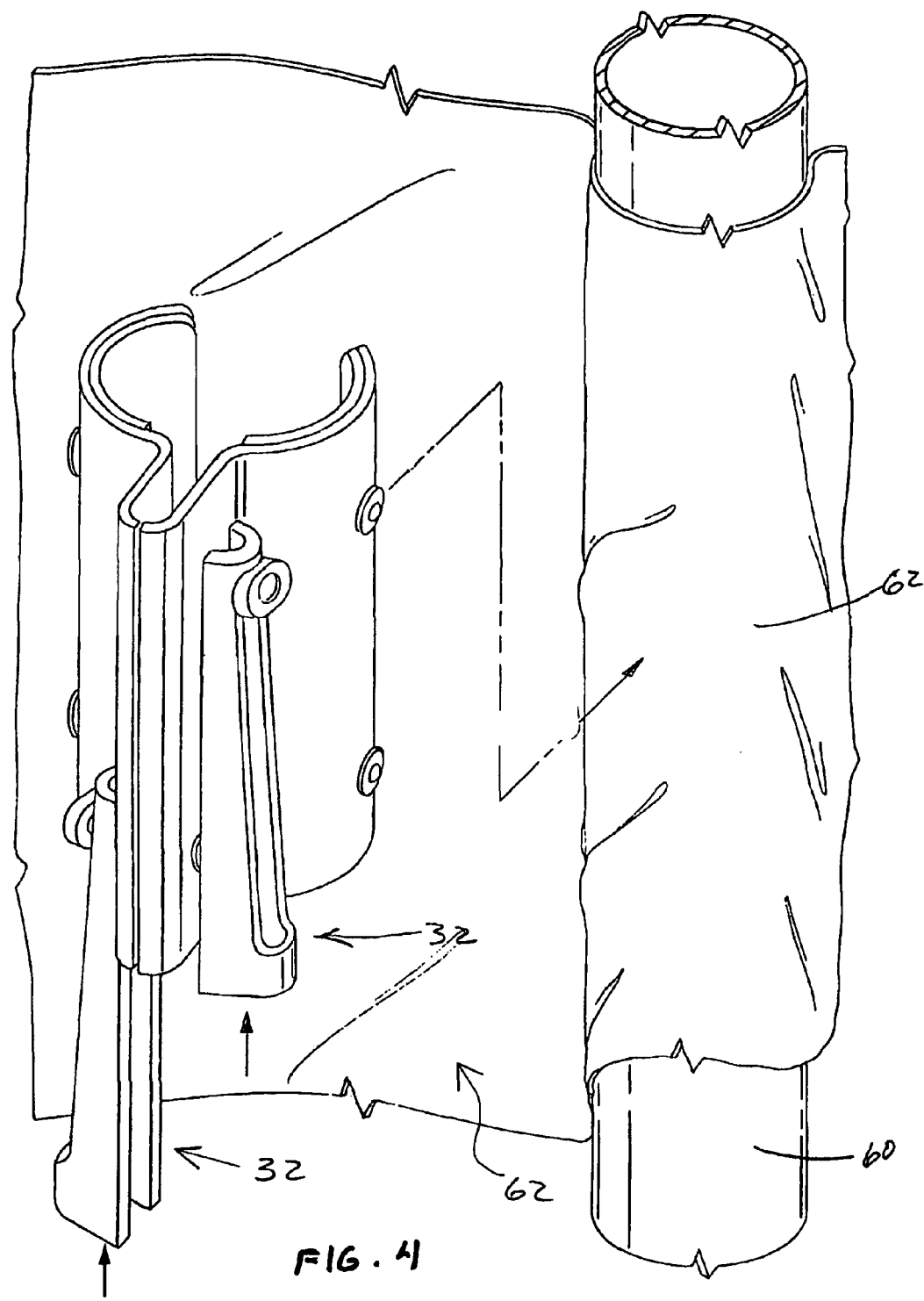
FIG. 4 shows the particular clamp about to be applied to a vertical scaffolding support member.

DETAILED DESCRIPTION ACCORDING TO THE PREFERRED EMBODIMENTS OF THE PRESENT INVENTION IN WHICH

The scaffolding system 2 is shown in a typical application adjacent the building structure 3 and the system includes a series of tubular legs 4, tubular cross braces 6 and tubular horizontals 8. The particular system shown is basically a tube and clamp type scaffolding however it is also common to use a scaffolding frame system interconnected by braces etc. Therefore many different forms of the scaffolding system are possible. These systems all essentially use tubular uprights, horizontals and braces and provide a work platform 12 at different heights to allow the worker to perform a particular task.

In some circumstances it is desirable to provide a windbreak or weather break about a portion of the scaffolding and in this case a fabric shroud 16 can be secured to the scaffolding system. A series of clamps 20 releaseably secure the fabric shroud 16 to any of the tubular uprights, horizontals or diagonals of an appropriate diameter at any point along their length.

FIGS. 2 through 8 show further details of the clamp. Each elongate clamp 20 includes opposed jaws 22 with opposed engagement flanges 24 provided to one side of the gripping arms 25 of the jaws. The gripping arms are shaped to engage the outer periphery of a support member of the scaffolding system. Pin and wedge combinations 28 are provided at opposite ends of the engagement flanges 24 and are used to draw the jaws into an engagement with a support member and to trap the fabric shroud between the jaws and the support member. In the clamp shown, each pin 31 is a double-headed pin that has a trapped wedge 32 secured thereon. The wedge 32 includes an elongate slot 34 which allows movement of the wedge along the pin with the head of the pin engaging either side of the slot. With this arrangement the wedges may be brought to the release position of FIGS. 2 and 3 to allow the jaws to open and provide a relatively wide elongate opening 50. This allows the jaws to be placed on either side of a tubular member with the fabric shroud located interior of the jaws.

The securement of the clamp to an upright member 60 is shown in FIG. 4. As can be seen each of the wedges 32 are in the released position and the jaws are opened to a relatively wide position for engagement on either side of the tubular upright 60. The fabric shroud 62 has been partially wrapped around the tubular upright 60 and the clamp is about to be applied to the upright to secure the shroud to the upright.

Figure 5:
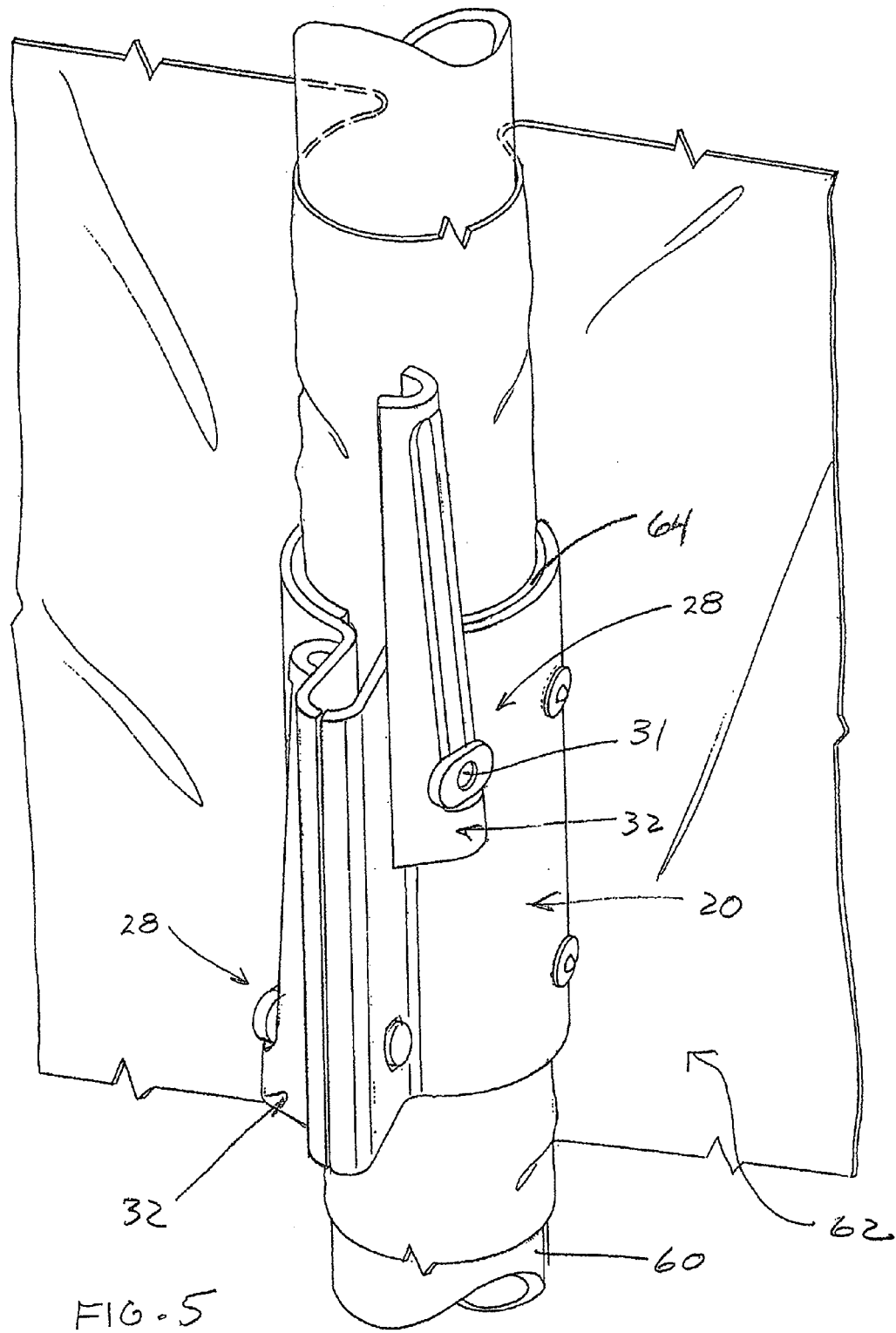
FIG. 5 shows the clamp of FIG. 4 in engagement with the shrouding and the support member maintaining the shrouding in engagement with the support member.

The secured arrangement is shown in FIG. 5. In this case it can be seen that the wedges have been driven upwardly and this draws the two engagement flanges towards one another and forces movement of the jaws towards one another to lock the clamp on the tubular upright 60. Each of the jaws have been lined with a resilient compressible material 64 to basically separate the metal of the clamp from the fabric of the shroud. This also provides some resilient deformation as the jaws are secured about the upright. The wedges can easily be struck by a hammer to effect the drawing of the engagement flanges towards one another. The fact that the wedges are located on pins at opposite ends of the engagement flanges provides positive securement of the elongate clamp to the upright. The wedge to the right side of FIG. 5 could be reversed in orientation and driven downwardly.

These wedges also allow simple release of the clamp from the upright when required. A worker merely has to strike the edge of the wedge and the wedge will move on the pin and effect the appropriate release.

Figure 6:
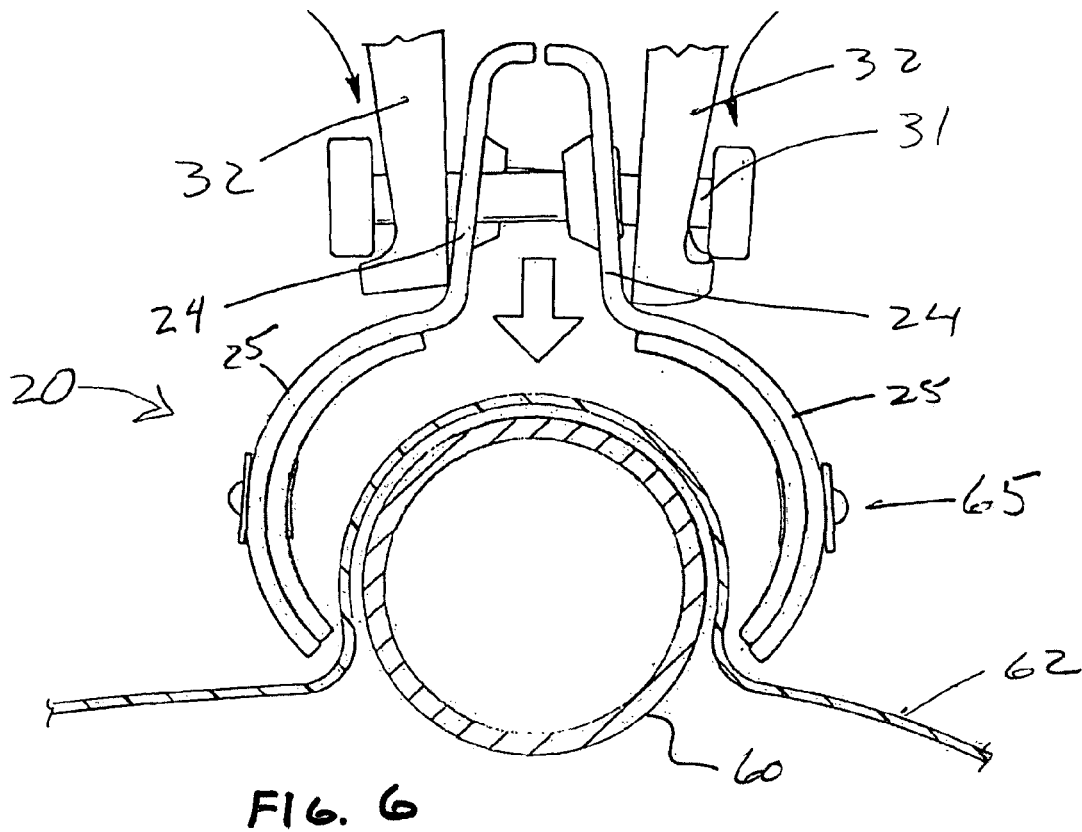
FIG. 6 is a top view showing the opening of the clamp to locate the shrouding and support to interior to the jaws of the clamp.
Figure 7:
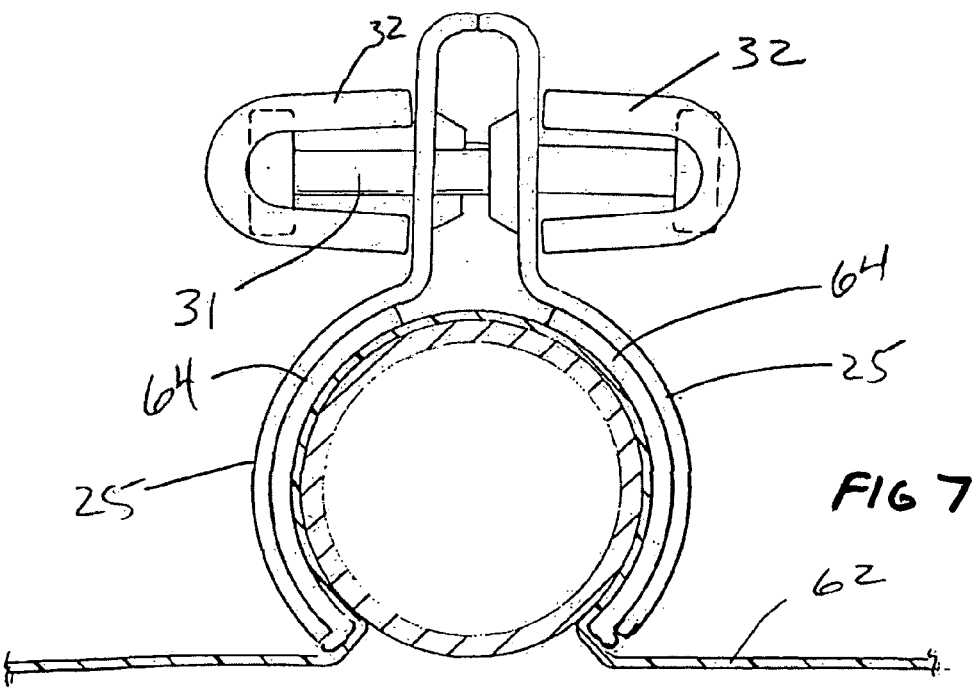
FIG. 7 shows the clamp in a closed positions.

FIGS. 6 and 7 again show the opening of the clamp to position the clamp and the shroud about the upright in preparation for closing of the clamp. FIG. 7 shows the closing of the elongate clamp and locking of the clamp to the upright. FIGS. 6 and 7 also illustrate the compressible liner 64 extending to the open edge of the respective jaw. This material can also extend slightly beyond the jaw edge to further protect the fabric shroud if desired (see FIG. 7). This resilient material is shown as being secured to the jaws by rivets 65 but any suitable attachment arrangement may be used.

Figures 8, 9:
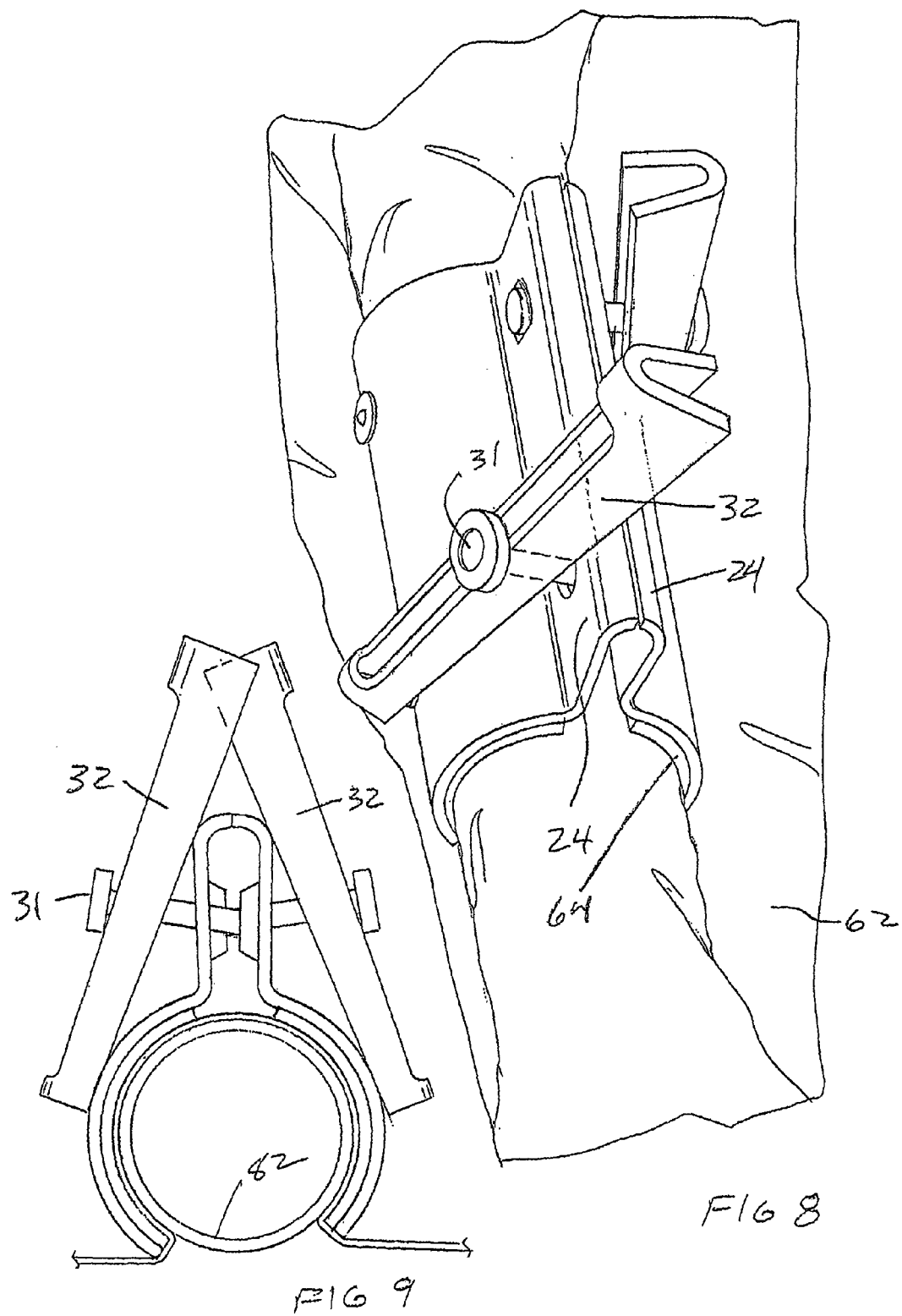
FIG. 8 shows the clamp used in an alternate orientation of the wedges and securing the shroud into horizontal member.
FIG. 9 is an end view showing the alternate securing orientation of FIG. 8.

FIG. 8 and 9 show an alternate orientation of the wedges for securing of the clamp to a support member. This particular perspective view and end view shows securement to a horizontal support member 82. In this case the wedges are orientated across the engagement flanges and strike the exterior of the jaws. This alternate orientation may be used where there is not sufficient clearance to allow the movement of the wedges along the engagement flanges. Thus the wedges can be used in effectively two different manners for drawing of the jaws towards one another and the securement of the shroud to a tabular scaffold support member.

The opening 50 of the elongate clamp is relatively small relative to the length of the clamp. Basically, the clamp is elongate to provide securement of the shroud along a substantial portion thereof to distribute any forces exerted on the shroud due to wind etc. Basically it is important to provide effective securement of the shroud to avoid tearing thereof. The use of the resilient liner and the elongation of the clamp to provide a substantial clamping in the length of the support member has proven particularly effective. Preferably the length is three or more times the gap between the jaws in a clamping position.

Although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as follows:

1. An elongate sheet securing scaffold clamp for use in securing a sheet material to a tubular scaffold member, said clamp comprising: first and second opposed jaw members opening on one side to receive said tubular scaffold member upright therebetween;
    a resilient compressive layer lining in each jaw defining an interior surface of each jaw;
    each jaw member on a side opposite said one side, including an engagement flange in overlapping relationship with the engagement flange of the other jaw member, said jaw members being adjustably secured in opposed relationship by a first pin and wedge and a second pin and wedge;
    said first pin and wedge being retained at one end of said opposed engagement flanges and said second pin and wedge being secured to an opposite end of said opposed engagement flanges with said wedges located respectively on opposite sides of said engagement flanges, said wedges being movable from a release position where the jaws can be separated to provide an opening between said jaw members on said one side to a closed position where said first and second pin and wedges draw said jaws towards one another to effect gripping about said tubular scaffold member inserted between said jaws,
    wherein each pin and wedge is pivotally supported in said engagement flanges and rotatable to allow alignment of said wedges along said engagement flanges or across said engagement flanges to effect movement of jaws towards one another, said wedges when positioned across said engagement flanges each being movable to engage one of said jaw members at a position spaced from said engagement flanges and urge the jaw member to said closed position, each wedge including a center slot running between opposed ends of said wedge and wherein the pin associated with the wedge passes through the center slot and captures said wedge on said pin.

2. An elongate sheet securing scaffold clamp as claimed in claim 1 wherein said opening defines a maximum gap between said jaws less than 50% of a length of said engagement flanges.

3. An elongate sheet securing scaffold clamp as claimed in claim 1 wherein said clamp is reversible in orientation.

* * * * *